United States Patent [19]

Jones

[11] Patent Number: 5,589,816
[45] Date of Patent: Dec. 31, 1996

[54] METHOD AND DEVICE FOR DETECTING A DEFLATED TIRE ON A VEHICLE

[75] Inventor: David Jones, Lichfield, England

[73] Assignee: Sumitomo Rubber Industries, Ltd., Hyogo, Japan

[21] Appl. No.: 335,822

[22] PCT Filed: Mar. 29, 1994

[86] PCT No.: PCT/JP94/00501
    § 371 Date: Nov. 16, 1994
    § 102(e) Date: Nov. 16, 1994

[87] PCT Pub. No.: WO94/22681
    PCT Pub. Date: Oct. 13, 1994

[30]     Foreign Application Priority Data

Apr. 1, 1993 [GB] United Kingdom ............... 9306846.8

[51] Int. Cl.⁶ ........................................... B60C 23/00
[52] U.S. Cl. .......................... 340/444; 340/442; 73/146.5
[58] Field of Search ........................... 340/442, 444; 73/146.5

[56]          References Cited

FOREIGN PATENT DOCUMENTS 0512745  11/1992  European Pat. Off. .
    0579446  1/1994   European Pat. Off. .

*Primary Examiner*—Jeffery Hofsass
*Assistant Examiner*—Daryl C. Pope

[57]         ABSTRACT

A method and device for detecting a deflated tire on a vehicle by comparing the rolling radii of the tires by means of comparing angular velocity speed signals from wheel speed sensors, one at each wheel, characterized by calculating an error value DEL', where $$DEL' = \frac{[(C1 = C4)/2 - (C2 + C3)/2] \times 100}{(C1 + C2 + C3 + C4)/4}$$

wherein C1, C2, C3 and C4 are angular velocity values for left-hand front, right=hand front, left-hand rear and right-hand rear wheels of the vehicle respectively, determining a correction factor LAT, calculating a corrected error value DEL where $$DEL = DEL' - DELCOR$$

wherein $$DELCOR = (LAT \times A) + (B \times LAT^2)$$

wherein A and B are vehicle related constants, and operating a tire warning indicator provided in the vehicle to indicate that at least one tire is deflated when it is sensed that the magnitude of the corrected error value DEL is in the range 0.05 to 0.5.

25 Claims, 3 Drawing Sheets

METHOD AND DEVICE FOR DETECTING A DEFLATED TIRE ON A VEHICLE

TECHNICAL FIELD

This invention relates to a method of detecting a deflated tire on a vehicle suitable for cars, trucks or the like.

BACKGROUND ART

Prior applications such as French Patent Publication No. 2568519 and European Patent Publication No. 291 217 propose using wheel speed signals from the vehicle wheels such as for example the signals from an anti-lock braking system which are multi-pulse signals of typically 48 to 96 pulses per revolution of each wheel. The prior art system compares the speed derived signals in various ways, and also attempts to overcome errors due to vehicle factors such as cornering, braking, accelerating, uneven or changing loads, etc., which can cause changes in the speed signals which are larger than those caused by a tire deflation of, for example, 0.4 bar.

French Patent Publication No. 2568519 avoided errors of this type by monitoring the speeds of the diagonally opposed pairs of wheels for a long time or distance period so that it averaged out effectively cornering of the vehicle. The result however was that the device operated very slowly taking many kilometers to sense a pressure loss.

European Patent Publication No. 291 217 improved the situation by calculating the lateral and longitudinal acceleration of the vehicle using the same four wheel speed signals and setting fixed limits above which the detection system was inhibited to avoid false signals due to cornering and acceleration. This inhibition of detection however meant that for a proportion of the time of vehicle running the system was not sensing punctures, the actual proportion depending upon the type of roads and the way the vehicle was being driven.

The real difficulty with these types of systems is that, apart from the lateral acceleration of the vehicle which occurs during cornering causing increased deflection of the outer pair of wheels compared to the inner pair of wheels, each vehicle has different characteristics due to the position of the center of gravity and the type of suspension. These different characteristics, when concerning, produce additional deflections in the outer pairs of tires with regard to the inner pairs of tires.

However, the vehicle characteristics make the tire deflections different in each of the tires. Similar problems occur due to vehicle characteristics in the deflections in the front pair of tires compared to the rear pair tires when the vehicle brakes, and vice-versa when the vehicle accelerates.

SUMMARY OF THE INVENTION

It is an object of the present invention to provide a method of detecting a deflated tire on a vehicle which accommodates the above changes, avoiding false signals and detecting deflation for substantially all the time when the vehicle is running.

According to one aspect of the present invention there is provided a method of detecting a deflated tire on a vehicle by comparing the rolling radii of the tires by means of comparing angular velocity speed signals from wheel speed sensors one at each wheel characterised by calculating an error value DEL' where $$DEL' = \frac{[(C1+C4)/2 - (C2+C3)/2] \times 100}{(C1+C2+C3+C4)/4}$$

where C1, C2, C3 and C4 are angular velocity values for left-hand front, right-hand front, left-hand rear and right-hand rear wheels of the vehicle respectively, determining a correction factor LAT, calculating a corrected error value DEL where $$DEL = DEL' - DELCOR$$

wherein $$DELCOR = (A \times LAT) + (B \times LAT^2)$$

wherein A and B are vehicle related constants, and operating a tire warning indicator provided in the vehicle to indicate that at least one tire is deflated when it is sensed that the magnitude of the corrected error value DEL is in the range 0.05 to 0.5.

Preferably the tire warning indicator is operated when the magnitude of the corrected error value is in the range 0.1 to 0.3.

The vehicle related constants A and B may have values in the range −5.0E-7 to +5.0E-7 and −4.01E-9 to +4.0E-9 respectively.

The correction factor LAT is found by calculating from the four angular velocity values C1, C2, C3 and C4 respective first, second, third and fourth deciding factors (MC1, MC2, MC3, MC4) where $$MC1 = C1$$

$$MC2 = C2/[(C2+C4)/(C1+C3)]$$

$$MC3 = C3/[(C3+C4)/(C1+C2)]$$

$$MC4 = C4/[[(C2+C4)/(C1+C3)] \times [(C3+C4)/(C1+C2)]]$$

summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $$LAT = 2 \times (C3-C4) \times (C1+C2+C3+C4),$$

if the third or fourth deciding factor (MC3 or MC4) is greater than the central deciding factor (MPSD) then $$LAT = 2 \times (C1-C2) \times (C1+C2+C3+C4),$$

or if none of the deciding factors (MC1, MC2, MC3 or MC4) is greater than the central deciding factor (MPSD) then $$LAT = (C1+C3-C2-C4) \times (C1+C2+C3+C4).$$

The centralising constant used in the derivation of the central deciding factor MPSD may be in the range of 0.250125 to 0.250625 and preferably has a value of 0.25025.

The particular tire which is deflated may be detected by calculating for each wheel a deflation indicating factor IMC1, IMC2, IMC3 and IMC4 respectively and then selecting the factor having the largest numerical value, the deflation indicating factors being calculated as follows:

$$IMC1 = C1$$

if the first deciding factor (MC1) is greater than the central deciding factor (MPSD) then $IMC2=C2/[((C4/C3)/2)+0.5]$ $IMC3=C3/[((C4/C2)/2)+0.5]$ $IMC4=C4/[[((C4/C3)/2)+0.5]\times[((C4/C2)/2)+0.5]];$ if the second deciding factor (MC2) is greater than the central deciding factor (MPSD) then $IMC2=C2/[((C4/C3)/2)+0.5]$ $IMC3=C3/[((C3/C1)/2)+0.5]$ $IMC4=C4/[[((C4/C3)/2)+0.5]\times[((C3/C1)/2)+0.5]];$ if the third deciding factor (MC3) is greater than the central deciding factor (MPSD) then $IMC2=C2/[((C2/C1)/2)+0.5]$ $IMC3=C3/[((C4/C2)/2)+0.5]$ $IMC4=C4/[[((C2/C1)/2)+0.5]\times[((C4/C2)/2)+0.5]];$ if the fourth deciding factor (MC4) is greater than the central deciding factor (MPSD) then $IMC2=C2/[((C2/C1)/2)+0.5]$ $IMC3=C3/[((C3/C1)/2)+0.5]$ $IMC4=C4/[[((C2/C1)/2)+0.5]\times[((C3/C1)/2)+0.5]];$ or if none of the deciding factor (MC1, MC2, MC3, MC4) is greater than the central deciding (MPSD) factor then $IMC2=C2/[(((C2+C4)/(C1+C3))/2)+0.5]$ $IMC3=C3/[(((C3+C4)/(C1+C2))/2)+0.5]$ $IMC4=C4/[[(((C3+C4)/(C1+C2))/2)+0.5]\times[(((C2+C4)/(C1+C3))/2)+0.5]].$ Whilst the invention in fact compares the angular velocities of the wheels it should be understood that this can be done by comparing the times for one full turn of each wheel or by comparing digital signals for multipulse wheel speed generators.

To allow for tires from different manufacturers which may therefore be of different sizes, an initialisation procedure may be carried out. This monitors the signals under normal driving conditions and enables constants for each wheel to be determined to allow for variations.

BEST MODE FOR CARRYING OUT THE INVENTION

Further aspects of the present invention will become apparent from the following description, by way of example only, of one embodiment in conjunction with the attached diagrammatic drawings.

Figure 1:
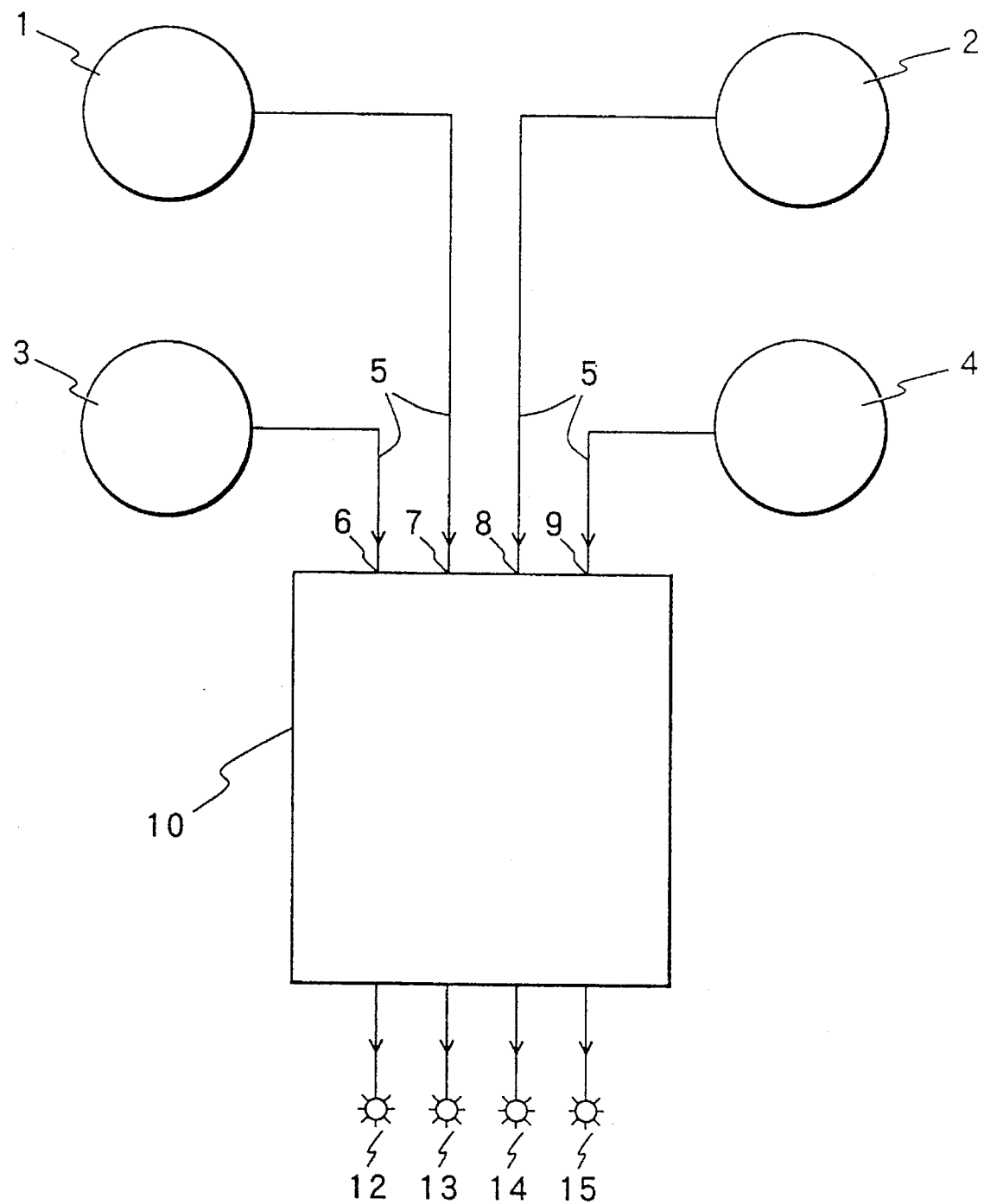
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels respectively, and wheels 3 and 4 are the left- and right-hand rear wheels respectively. Each wheel has a toothed wheel device associated with it of the type designed and fitted to provide a digital signal comprising a magnetic pick-up of the type used for a vehicle anti-skid system of the electronic type-often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted then the microprocessor 10 may be the same microprocessor as the ABS system. Alternatively, a separate microprocessor may be provided.

The respective values of the total digital pulse signals from each of the wheels 1, 2, 3 and 4 in a five second period are C1, C2, C3 and C4 respectively. The central processing unit 10 computes these frequency values as will be described below to determine whether or not to send a deflation warning signal to one of the warning lights 12, 13, 14 or 15.

Figure 2:
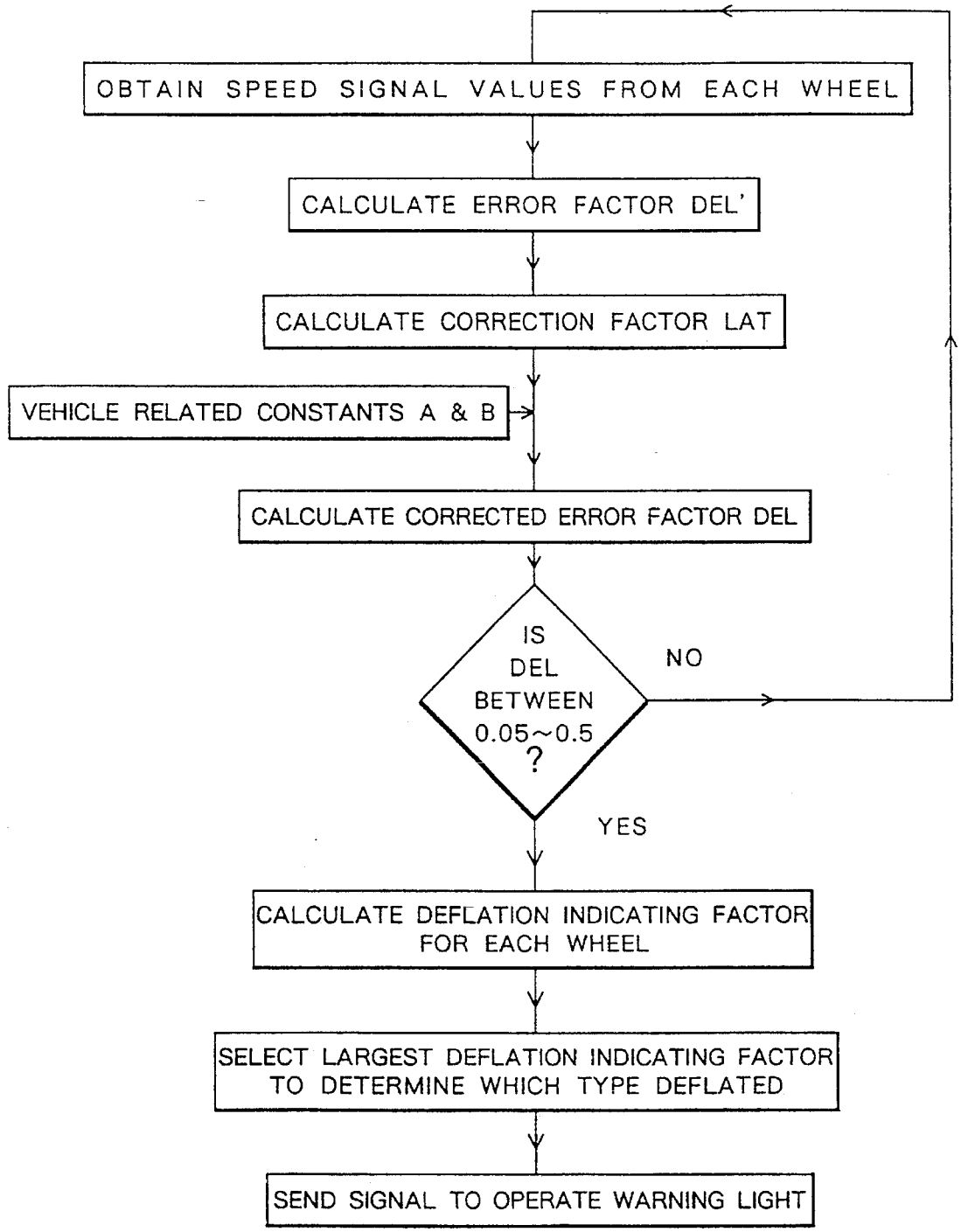
FIG. 2 is a flow chart showing the sequence of computations used to determine if a deflated tire exists and decide which one is deflated.

The sequence of operations used in this computation is shown schematically in FIG. 2.

The first operation in the method of the invention is to calculate from the actual wheel speed values C1–C4 an error value DEL' where $$DEL' = \frac{[(C1+C4)/2 - (C2+C3)/2] \times 100}{(C1+C2+C3+C4)/4}$$

However because the actual wheel speed values may be distorted due to vehicle factors such as cornering, braking, accelerating or uneven loads which give rise to a greater effect than that caused by a tire deflation it is necessary to correct this calculated error value to remove these vehicle effects.

To correct the error value DEL', a correction factor LAT is calculated according to the magnitude of respective deciding factors MC1–MC2 for each wheel in comparison to a central deciding factor MPSD. The central deciding factor is equal to the sum for the four deciding factors MC1–MC2 multiplied by a centralizing constant K, which in this embodiment is selected to be 0.25025. The value of the correction factor LAT is then calculated depending on which if any of the four deciding factors MC1–MC4 is greater in magnitude than the central deciding factor MPSD as follows:

| | |
|---|---|
| if | MC1 or MC2 > MPSD |
| then | LAT = 2 × (C3 − C4) × (C1 + C2 + C3 + C4) |
| or if | MC3 or MC4 > MPSD |
| then | LAT = 2 × (C1 − C2) × (C1 + C2 + C3 + C4) |
| otherwise | LAT = (C1 + C3 − C2 − C4) × (C1 + C2 + C3 + C4) |

Figure 3:
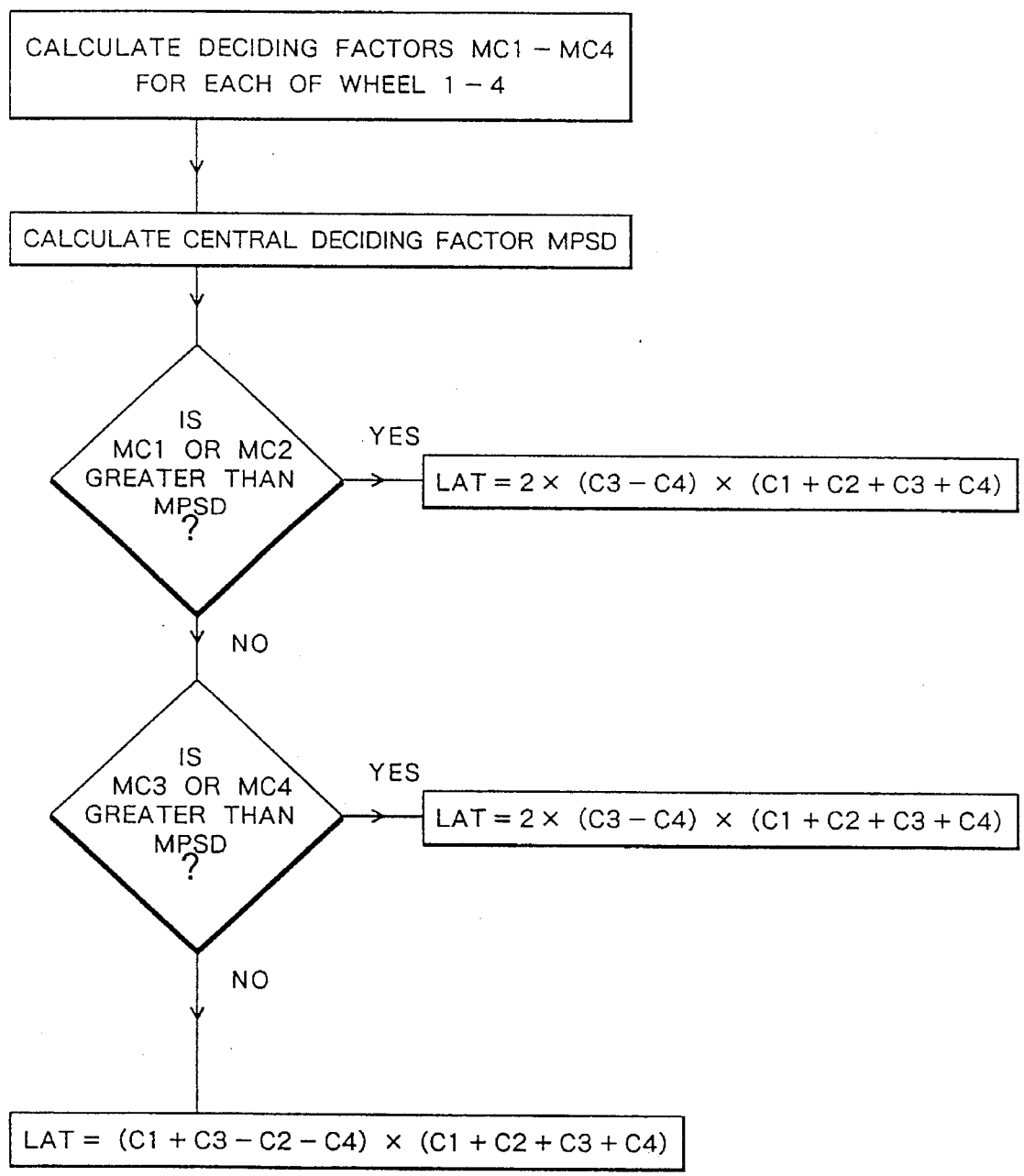
FIG. 3 is a flow chart showing the sequence of computations used in determining the correction factor LAT.

This sequence of operations is shown in FIG. 3.

The calculated error value DEL' is then corrected to remove vehicle effects to give a corrected error value DEL according to the following equation corrected error factor DEL=error factor DEL'−DELCOR wherein DELCOR= $(LAT \times A)+(LAT^2 \times B)$ wherein A and B are vehicle related constants which allow for vehicle factors such as the track and other dimensions of the vehicle and characteristics of the suspension particularly in relation to side-to-side tilt. The values of these constants A and B for a particular vehicle may be determined by experiment. Values of the constants which have been established for various cars are shown below in Table 1.

TABLE I

| Vehicle | Year | Constant A | Constant B |
| --- | --- | --- | --- |
| Audi 100 | 1992 | −1.8E-07 | −6.2E-10 |
| BMW 850i | 1992 | +1.0E-07 | +4.6E-10 |
| Peugeot 405 | 1992 | −3.3E-08 | −1.8E-10 |
| Rover 820SLi | 1992 | +1.4E-07 | −1.4E-09 |

Having calculated the corrected error value DEL, the central processing unit 10 then decides if the value of DEL is in the range of 0.05 to 0.5 which indicates the presence of a deflates tire.

Values of DEL below 0.05 are the result of minor statistical variation in the counts from each wheel, whereas values of DEL greater than 0.5 indicate a relatively uncommon occurrence such as wheel spin or a locked wheel and are greater than the effect of a punctured tire.

If the central processing unit 10 finds that the corrected error value is between 0.05 and 0.5 then the method of the invention moves on to the next stage which is to determine which tire is deflated. Otherwise, the system continues to monitor wheel speeds.

To determine which tire is deflated, the central processing unit 10 calculates for each wheel a deflation indicating factor IMC1–IMC4. These factors are calculated according to the following procedure:

$$IMC1=C1$$

if the first deciding factor (MC1) is greater than the central deciding factor (MPSD) then $$IMC2=C2/[((C4/C3)/2)+0.5]$$

$$IMC3=C3/[((C4/C2)/2)+0.5]$$

$$IMC4=C4/[[((C4/C3)/2)+0.5] \times [((C4/C2)/2)+0.5]];$$

if the second deciding factor (MC2) is greater than the central deciding factor (MPSD) then $$IMC2=C2/[((C4/C3)/2)+0.5]$$

$$IMC3=C3/[((C3/C1)/2)+0.5]$$

$$IMC4=C4/[[((C4/C3)/2)+0.5] \times [((C3/C1)/2+0.5)]];$$

if the third deciding factor (MC3) is greater than the central deciding factor (MPSD) then $$IMC2=C2/[((C2/C1)/2)+0.5]$$

$$IMC3=C3/[((C4/C2)/2)+0.5]$$

$$IMC4=C4/[[((C2/C1)/2)+0.5] \times [((C4/C2)/2)+0.5]];$$

if the fourth deciding factor (MC4) is greater than the central deciding factor (MPSD) then $$IMC2=C2/[((C2/C1)/2)+0.5]$$

$$IMC3=C3/[((C3/C1)/2)+0.5]$$

$$IMC4=C4/[[((C2/C1)/2)+0.5] \times [((C3/C1)/2)+0.5]];$$

or if none of the deciding factors (MC1, MC2, MC3, MC4) is greater than the central deciding (MPSD) factor then $$IMC2=C2/[(((C2+C4)/(C1+C3))/2)+0.5]$$

$$IMC3=C3/[(((C3+C4)/(C1+C2))/2)+0.5]$$

$$IMC4=C4/[[(((C3+C4)/(C1+C2))/2)+0.5] \times [(((C2+C4)/(C1+C3))/2)+0.5]].$$

Thus having obtained a deflation indicating factor for each of the four wheels 1–4 the central processing unit 10 compares these determine which wheel 1–4 has the factor of the largest magnitude. A signal is then sent to operate the indicator light 12–15 corresponding to that wheel in order to alert the driver that the tire concerned has deflated. In a preferred arrangement, the warning signal is only sent after three sets of deflation indicating factors, calculated from successive sets of wheel speed data, all indicate that a particular tire is deflated.

While the above embodiment has illustrated the method of the invention using the signal data from a multi-toothed wheel system typically producing 48 or 96 pulses per wheel revolution, the invention can equally be used with other wheel speed sending systems. For example, the method may be used with a simple system which uses a single pulse per revolution to compute the time period for one rotation of each wheel, in which case it will be necessary to multiply the wheel speeds by a constant factor to obtain data in the necessary form.

Furthermore, while the method of the invention has been illustrated by reference to the aforementioned values of constants A and B related to specific vehicles, values of constants A and B in the ranges of −5.0E-7 to +5.0E-7 and −4.0E-9 to +4.0E-9 respectively have been found useful in the invention. Values of A and B in the ranges −2.0E-7 to +2.0E-7 and −2.0E-9 to +1.0E-9 have been found particularly useful in practice of the invention.

Thus, according to a method of the present invention, difference of tire deflations in each of the tires due to vehicle characteristics can be accommodated to avoid false signals. Deflation for substantially all the time when the vehicle is running can be detected. The method can be widely applied to vehicles such as cars and trucks.

The invention being thus described, it will be obvious that the same may be varied in many ways. Such variations are not to be regarded as a departure from the spirit and scope of the invention, and such modifications as would be obvious to one skilled in the art are intended to be included within the scope of the following claims.

I claim:

1. A method of detecting a deflated tire on a vehicle comprising the steps of:

comparing the rolling radii of the tires by comparing angular velocity signals from wheel speed sensors one at each wheel;

calculating an error value (DEL') where $$DEL' = \frac{[(C1 = C4)/2 - (C2 + C3)/2] \times 100}{(C1 + C2 + C3 + C4)/4}$$

where C1, C2, C3 and C4 are angular velocity values for left-hand front, right-hand front, left-hand rear and right-hand rear wheels of the vehicle respectively;

determining a correction factor;

calculating a corrected error signal (DEL) where $$DEL=DEL'-DELCOR$$

wherein $$DELCOR=(LAT \times A)+(B \times LAT^2)$$

wherein

A and B are vehicle related constants;

outputting a warning signal when a magnitude of the corrected error signal is between 0.05 and 0.5; and operating a tire warning indicator indicating that at least one tire is deflated when said warning signal is output.

2. A method of detecting a deflated tire according to claim 1, wherein the step of determining said correction factor LAT comprises calculating from the four angular velocity values C1, C2, C3 and C4 respective first, second, third and fourth deciding factors MC1, MC2, MC3, MC4 where $$MC1=C1$$

$$MC2=C2/[(C2+C4)/(C1+C3)]$$

$$MC3=C3/[(C3+C4)/(C1+C2)]$$

$$MC4=C4/[[(C2+C4)/(C1+C3)] \times [(C3+C4)/(C1+C2)]],$$

then summing the four deciding factors and multiplying this sum by a centralizing constant K to give a central deciding factor MPSD and selecting the correction factor LAT as follows, if the first or second deciding factor MC1 or MC2 is greater than the central deciding factor MPSD then $$LAT=2 \times (C3-C4) \times (C1+C2+C3+C4),$$

if the third or fourth deciding factor MC3 or MC4 is greater than the central deciding factor MPSD then $$LAT=2 \times (C1-C2) \times (C1+C2+C3+C4),$$

or if none of the deciding factors MC1, MC2, MC3 or MC4 is greater than the central deciding factor MPSD then $$LAT=(C1+C3-C2-C4) \times (C1+C2+C3+C4).$$

3. A method of detecting a deflated tire according to claim 2, wherein the centralizing constant K has a value in the range 0.250125 to 0.250625.

4. A method of detecting a deflated tire according to claim 2, wherein the centralizing constant K has a value of 0.25025.

5. A method of detecting a deflated tire according to claim 2, further comprising calculating a deflation indicating factor IMC1, IMC2, IMC3, IMC4 for each wheel respectively and indicating the wheel having the numerically greater deflation indicating factor as being deflated, where the calculation of the deflation indicating factors comprises:

$$IMC1=C1,$$

then if the first deciding factor MC1 is greater than the central deciding factor MPSD then $$IMC2=C2/[((C4/C3)/2)+0.5]$$

$$IMC3=C3/[((C4/C2)/2)+0.5]$$

$$IMC4=C4/[[((C4/C3)/2)+0.5] \times [((C4/C2)/2+0.5]];$$

if the second deciding factor MC2 is greater than the central deciding factor MPSD then $$IMC2=C2/[((C4/C3)/2)+0.5]$$

$$IMC3=C3/[((C3/C1)/2)+0.5]$$

$$IMC4=C4/[[((C4/C3)/2)+0.5] \times [((C3/C1)/2)+0.5]];$$

if the third deciding factor MC3 is greater than the central deciding factor MPSD then $$IMC2=C2/[((C2/C1)/2)+0.5]$$

$$IMC3=C3/[((C3/C1)/2)+0.5]$$

$$IMC4=C4/[[((C2/C1)/2)+0.5] \times [((C4/C2)/2)+0.5]];$$

if the fourth deciding factor MC4 is greater than the central deciding factor MPSD then $$IMC2=C2/[((C2/C1)/2)+0.5]$$

$$IMC3=C3/[((C3/C1)/2)+0.5]$$

$$IMC4=C4/[[((C2/C1)/2)+0.5] \times [((C3/C1)/2)+0.5]];$$

or if none of the deciding factors MC1, MC2, MC3, MC4 is greater than the central deciding MPSD factor then $$IMC2=C2/[(((C2+C4)/(C1+C3))/2)+0.5]$$

$$IMC3=C3/[(((C3+C4)/(C1+C2))/2)+0.5]$$

$$IMC4=C4/[[(((C3+C4)/(C1+C2))/2)+0.5] \times [(((C2+C4)/(C1+C3))/2)+0.5]].$$

6. A method of detecting a deflated tire according to claim 1 wherein said outputting step is performed when the magnitude of the corrected error signal DEL is in the range 0.1 to 0.3.

7. A method of detecting a deflated tire according to claim 1 wherein the value of the vehicle related constant A is in the range −5.0E-7 to +5.0E-7 and the value of vehicle related constant B is in the range −4.0E-9 to +4.0E-9.

8. A method of detecting a deflated tire according to claim 1 wherein the value of the vehicle related constant A is in the range −2.0E-7 to +2.0E-7 and the value of the vehicle related constant B is in the range −2.0E-9 to +1.0E-9.

9. A method of detecting a deflated tire according to claim 1 wherein the value of the vehicle related constants A and B are −1.8E-7 to −6.2E-10 respectively.

10. A method of detecting a deflated tire according to claim 1 wherein the value of the vehicle related constants A and B are −1.0E-7 to +4.6E-10 respectively.

11. A method of detecting a deflated tire according to claim 1 wherein the value of the vehicle related constants A and B are −3.3E-8 to −1.8E-10 respectively.

12. A method of detecting a deflated tire according to claim 1 wherein the value of the vehicle related constants A and B are +1.4E-7 to −1.4E-9 respectively.

13. A deflated tire detector comprising:
a plurality of speed sensors each provided for a corresponding tire of a plurality of tires on a vehicle, each of said speed sensors outputting an angular velocity of said corresponding tire;
means for comparing rolling radii of said tires including means for calculating an error signal (DEL') where $$DEL' = \frac{[(C1 = C4)/2 - (C2 + C3)/2] \times 100}{(C1 + C2 + C3 + C4)/4}$$

where C1, C2, C3 and C4 are angular velocity output by said speed sensors for left-hand front, right-hand front, left-hand rear and right-hand rear tires of the vehicle respectively,
means for determining a correction factor (LAT),
means for determining a corrected error signal (DEL) where $$DEL = DEL' - DELCOR$$

wherein $$DELCOR = (LAT \times A) + (B \times LAT^2)$$

wherein
A and B are vehicle related constants, and
means for determining when a magnitude of said corrected error signal is between 0.05 and 0.5 and for outputting a warning signal in response thereto; and
a warning indicator, receiving said warning signal and providing a warning in accordance therewith.

14. The deflated tire detector according to claim 13, wherein said warning indicator is a light in the vehicle.

15. The deflated tire detector according to claim 13, wherein said warning indicator comprises a plurality of warning indicators, corresponding to said plurality of speed sensors.

16. The deflated tire detector according to claim 13, wherein each of said speed sensors comprises a toothed wheel device.

17. The deflated tire detector according to claim 13, wherein said means for determining said correction factor LAT comprises:
means for calculating, from the four angular velocity values C1, C2, C3 and C4, respective first, second, third and fourth deciding factors MC1, MC2, MC3, MC4 where $$MC1 = C1$$

$$MC2 = C2/[(C2+C4)/(C1+C3)]$$

$$MC3 = C3/[(C3+C4)/(C1+C2)]$$

$$MC4 = C4/[[(C2+C4)/(C1+C3)] \times [(C3+C4)/(C1+C2)]];$$

means for summing the four deciding factors and outputting a sum;
means for multiplying said sum by a centralizing constant K to give a central deciding factor MPSD; and
means for selecting the correction factor LAT as follows,
if the first or second deciding factor MC1 or MC2 is greater than the central deciding factor MPSD then $$LAT = 2 \times (C3-C4) \times (C1+C2+C3+C4),$$

if the third or fourth deciding factor MC3 or MC4 is greater than the central deciding factor MPSD then $$LAT = 2 \times (C1-C2) \times (C1+C2+C3+C4),$$

or if none of the deciding factors MC1, MC2, MC3 or MC4 is greater than the central deciding factor MPSD then $$LAT = (C1+C3-C2-C4) \times (C1+C2+C3+C4).$$

18. The deflated tire detector according to claim 17, wherein centralizing constant K has a value in the range 0.250125 to 0.250625.

19. The deflated tire detector according to claim 17, wherein centralizing constant K has a value of 0.25025.

20. The deflated tire detector according to claim 17, further comprising means for calculating a deflation indicating factor IMC1, IMC2, IMC3, IMC4 for each wheel respectively and means for indicating the wheel having the numerically greater deflation indicating factor as being deflated, where the calculation of the deflation indicating factors comprises:

$$IMC1 = C1,$$

then if the first deciding factor MC1 is greater than the central deciding factor MPSD then $$IMC2 = C2/[((C4/C3)/2)+0.5]$$

$$IMC3 = C3/[((C4/C2)/2)+0.5]$$

$$IMC4 = C4/[[((C4/C3)/2)+0.5] \times [((C4/C2)/2+0.5]];$$

if the second deciding factor MC2 is greater than the central deciding factor MPSD then $$IMC2 = C2/[((C4/C3)/2)+0.5]$$

$$IMC3 = C3/[((C3/C1)/2)+0.5]$$

$$IMC4 = C4/[[((C4/C3)/2)+0.5] \times [((C3/C1)/2)+0.5]];$$

if the third deciding factor MC3 is greater than the central deciding factor MPSD then $$IMC2 = C2/[((C2/C1)/2)+0.5]$$

$$IMC3 = C3/[((C3/C1)/2)+0.5]$$

$$IMC4 = C4/[[((C2/C1)/2)+0.5] \times [((C4/C2)/2)+0.5]];$$

if the fourth deciding factor MC4 is greater than the central deciding factor MPSD then $$IMC2 = C2/[((C2/C1)/2)+0.5]$$

$$IMC3 = C3/[((C3/C1)/2)+0.5]$$

$$IMC4 = C4/[[((C2/C1)/2)+0.5] \times [((C3/C1)/2)+0.5]];$$

or if none of the deciding factors MC1, MC2, MC3, MC4 is greater than the central deciding MPSD factor then $$IMC2 = C2/[(((C2+C4)/(C1+C3))/2)+0.5]$$

$$IMC3 = C3/[(((C3+C4)/(C1+C2))/2)+0.5]$$

$$IMC4 = C4/[[(((C3+C4)/(C1+C2))/2)+0.5] \times [(((C2+C4)/(C1+C3))/2)+0.5]].$$

21. The deflated tire detector according to claim 13 wherein the value of the vehicle related constant A is in the range −5.0E-7 to +5.0E-7 and the value of vehicle related constant B is in the range −4.0E-9 to +4.0E-9.

22. The deflated tire detector according to claim 13 wherein the value of the vehicle related constant A is in the range −2.0E-7 to +2.0E-7 and the value of the vehicle related constant B is in the range −2.0E-9 to +1.0E-9.

23. The deflated tire detector according to claim 13 wherein the value of the vehicle related constants A and B are −1.8E-7 to −6.2E-10 respectively.

24. The deflated tire detector according to claim 13 wherein the value of the vehicle related constants A and B are −1.0E-7 to +4.6E-10 respectively.

25. The deflated tire detector according to claim 13 wherein the value of the vehicle related constants A and B are −3.3E-8 to −1.8E-10 respectively.

* * * * *